(12) United States Patent
Bugler et al.

(10) Patent No.: US 10,962,292 B2
(45) Date of Patent: Mar. 30, 2021

(54) HYBRID COOLER WITH BIFURCATED EVAPORATIVE SECTION

(71) Applicant: Evapco, Inc., Taneytown, MD (US)

(72) Inventors: Tom W. Bugler, Middletown, MD (US); Jennifer Jane Hamilton, Frederick, MD (US)

(73) Assignee: Evapco, Inc., Taneytown, MD (US)

( * ) Notice: Subject to any disclaimer, the term of this patent is extended or adjusted under 35 U.S.C. 154(b) by 0 days.

(21) Appl. No.: 15/895,434

(22) Filed: Feb. 13, 2018

(65) Prior Publication Data

US 2018/0238625 A1 Aug. 23, 2018

Related U.S. Application Data

(62) Division of application No. 13/839,704, filed on Mar. 15, 2013, now Pat. No. 9,891,001.

(60) Provisional application No. 61/612,095, filed on Mar. 16, 2012.

(51) Int. Cl.
| | |
|---|---|
| *F28C 3/08* | (2006.01) |
| *F28F 27/02* | (2006.01) |
| *F28C 1/14* | (2006.01) |
| *F28D 5/02* | (2006.01) |

(52) U.S. Cl.
CPC .............. *F28C 3/08* (2013.01); *F28C 1/14* (2013.01); *F28D 5/02* (2013.01); *F28F 27/02* (2013.01)

(58) Field of Classification Search
CPC ........ F28C 3/08; F28C 1/14; F28C 2001/145; F28C 5/02; F28C 25/02; F28C 27/02; F28C 27/003; F28C 165/287
See application file for complete search history.

(56) References Cited

U.S. PATENT DOCUMENTS

| | | | | |
|---|---|---|---|---|
| 1,861,158 A | * | 5/1932 | Hilger | F24F 3/1417 96/244 |
| 2,068,478 A | * | 1/1937 | Bergdoll | F25B 39/04 62/121 |
| 2,498,017 A | * | 2/1950 | Stutz | F25B 39/04 62/171 |
| 2,509,031 A | * | 5/1950 | Bockmeyer | F28D 5/00 62/171 |
| 2,680,603 A | * | 6/1954 | Taylor | F28C 1/02 261/22 |
| 2,732,190 A | * | 1/1956 | Name Not Available | F28C 1/04 261/21 |
| 3,065,587 A | * | 11/1962 | Fordyce | F28C 1/16 55/442 |

(Continued)

*Primary Examiner* — Travis C Ruby
(74) *Attorney, Agent, or Firm* — Whiteford, Taylor & Preston, LLP; Peter J. Davis

(57) ABSTRACT

A hybrid closed circuit heat exchanger having a dry indirect section and an evaporative indirect section. The evaporative indirect section has multiple sub-sections. An evaporative fluid distribution system is configured to selectively distribute evaporative fluid over all, part, or none of the sub-sections. A process fluid flow path control system is configured to selectively direct the process fluid through one or more sub-sections. The process fluid flow path control system may send all of the process fluid through two or more sub-sections in equal amounts or in different amounts. There is preferably no evaporative heat exchange section bypass flow path.

3 Claims, 19 Drawing Sheets

(56) References Cited

U.S. PATENT DOCUMENTS

| | | | | |
|---|---|---|---|---|
| 3,195,870 A | * | 7/1965 | Gruber | F28F 25/00 261/25 |
| 3,782,451 A | * | 1/1974 | Cates | F28C 1/04 165/283 |
| 3,865,911 A | * | 2/1975 | Lefevre | F28C 1/14 261/140.1 |
| 3,994,999 A | * | 11/1976 | Phelps | F28C 1/00 261/159 |
| 4,003,970 A | * | 1/1977 | Vodicka | F28C 1/14 261/159 |
| 4,076,771 A | * | 2/1978 | Houx, Jr. | F28C 1/14 165/900 |
| 4,236,574 A | * | 12/1980 | Bosne | F28B 1/06 165/67 |
| 4,315,873 A | * | 2/1982 | Smith | F28C 1/14 261/158 |
| 4,367,183 A | * | 1/1983 | Carbonaro | F28C 1/14 165/60 |
| 4,367,787 A | * | 1/1983 | Bradshaw | F24F 3/14 165/222 |
| 4,379,485 A | * | 4/1983 | Fisher, Jr. | F28B 1/00 165/110 |
| 4,380,910 A | * | 4/1983 | Hood | F24F 5/0035 62/91 |
| 4,476,065 A | * | 10/1984 | McKey | F28D 5/02 165/900 |
| 5,312,464 A | * | 5/1994 | Gay | B01J 19/32 261/112.2 |
| 5,390,502 A | * | 2/1995 | Storbeck | F28D 5/02 261/72.1 |
| 5,435,382 A | * | 7/1995 | Carter | F28C 1/14 165/110 |
| 5,449,036 A | * | 9/1995 | Genge | F28D 5/02 165/104.19 |
| 5,927,097 A | * | 7/1999 | Wright | F24F 12/001 62/309 |
| 5,944,094 A | * | 8/1999 | Kinney, Jr. | F28C 1/14 165/166 |
| 6,029,653 A | * | 2/2000 | Tiszai | A47J 37/1247 99/403 |
| 6,142,219 A | * | 11/2000 | Korenic | F28C 1/14 165/110 |
| 6,213,200 B1 | * | 4/2001 | Carter | F28C 1/14 165/110 |
| 6,385,987 B2 | * | 5/2002 | Schlom | F24F 1/0007 62/304 |
| 6,499,728 B2 | * | 12/2002 | Menzel | F28C 1/14 165/900 |
| 6,663,087 B2 | * | 12/2003 | Hubbard | F28C 1/14 165/166 |
| 7,310,958 B2 | * | 12/2007 | Carter | F28C 1/14 62/171 |
| 7,431,270 B2 | * | 10/2008 | Mockry | B01B 1/005 261/28 |
| 7,484,718 B2 | * | 2/2009 | Facius | F28C 1/14 261/153 |
| 7,600,743 B2 | * | 10/2009 | Dorin | F28F 25/087 261/152 |
| 7,765,827 B2 | * | 8/2010 | Schlom | F24F 5/0007 62/309 |
| 7,815,173 B2 | * | 10/2010 | Lin | F28D 3/02 261/151 |
| 7,887,030 B2 | * | 2/2011 | Hentschel | F28C 1/04 165/900 |
| 9,091,485 B2 | * | 7/2015 | Bugler, III | F28C 1/14 |
| 9,243,847 B2 | * | 1/2016 | Benz | F28B 1/06 |
| 2005/0193750 A1 | * | 9/2005 | Carter | F28C 1/14 62/171 |
| 2006/0197241 A1 | * | 9/2006 | Brenneke | F28F 27/003 261/152 |
| 2007/0187851 A1 | * | 8/2007 | Facius | F28C 1/14 261/161 |
| 2007/0241468 A1 | * | 10/2007 | Kammerzell | F28C 1/04 261/153 |
| 2010/0242516 A1 | * | 9/2010 | Seo | F28C 1/04 62/259.4 |

* cited by examiner

HYBRID COOLER WITH BIFURCATED EVAPORATIVE SECTION

FIELD OF THE INVENTION

The present invention relates to heat exchangers, and more particularly to closed circuit evaporative heat exchangers having a combination of direct and indirect closed circuit evaporative heat exchangers.

BACKGROUND OF THE INVENTION

Waste heat may be rejected to the atmosphere by dry or sensible heat exchangers. In a dry or sensible heat exchanger, there are two fluids: an air stream and a process fluid stream. In a closed system, the process fluid stream is enclosed so that there is no direct contact between the air stream and the process fluid stream; the process fluid stream is not open to the atmosphere. The enclosing structure may be a coil of tubes. Sensible heat is exchanged as the air stream is passed over the structure enclosing the process fluid stream. In the art these structures are known as "compact heat exchangers."

In most climates, evaporative heat exchangers offer significant process efficiency improvements over dry heat exchangers. One type of evaporative heat exchanger is a direct evaporative heat exchanger, also known in the industry as an open cooling tower. In a direct heat exchanger, only an air stream and an evaporative liquid stream are involved; the evaporative liquid stream is usually water, and the two streams come into direct contact with each other.

Another type of evaporative heat exchanger is an indirect closed circuit evaporative heat exchanger, where three fluid streams are involved: an air stream, an evaporative liquid stream, and an enclosed process fluid stream. The enclosed fluid stream first exchanges sensible heat with the evaporative liquid through indirect heat transfer, since it does not directly contact the evaporative liquid and then the air stream and the evaporative liquid exchange heat and mass when they contact each other.

Another type of evaporative heat exchanger is a combined direct and indirect closed circuit evaporative heat exchanger. Examples of combined systems are disclosed in U.S. Pat. Nos. 5,435,382, 5,816,318 and 6,142,219.

Both dry and evaporative heat exchangers are commonly used to reject heat as coolers or condensers. Evaporative coolers reject heat at temperatures approaching the lower ambient wet bulb temperatures, while dry coolers are limited to approaching the higher ambient dry bulb temperatures. In many climates the ambient wet bulb temperature is often 20° to 30° F. below the ambient design dry bulb temperature. Thus, in an evaporative cooler, the evaporative liquid stream may reach a temperature significantly lower than the ambient dry bulb temperature, offering the opportunity to increase the efficiency of the cooling process and to lower the overall process energy requirements. Evaporative condensers offer similar possibilities for increased efficiency and lower energy requirements. In spite of these opportunities to increase process efficiencies and lower overall process energy requirements, evaporative cooling and evaporative condensing are often not used due to concern about water consumption from evaporation of the evaporative liquid and freezing potentials during cold weather operation.

In addition, both sensible and evaporative heat exchangers are typically sized to perform their required heat rejection duty at times of greatest thermal difficulty. This design condition is typically expressed as the summer design wet bulb or dry bulb temperature. While it is often critical that the heat rejection equipment be able to reject the required amount of heat at these design conditions, the duration of these elevated atmospheric temperatures may account for as little as 1% of the hours of operation of the equipment. The remainder of the time, the equipment may have more capacity than required, resulting in unnecessary usage of additional evaporative liquid.

U.S. Pat. No. 6,142,219 discloses a closed circuit heat exchanger having three heat exchange sections: a dry indirect contact heat exchange section; a second indirect contact heat exchange section that is operable in either a wet or dry mode; and a direct contact heat exchange section. As a fluid cooler, a connecting flow path connects the dry indirect contact heat exchange section to the second indirect contact heat exchange section. A bypass flow path extends from the dry indirect contact heat exchange section to the process fluid outlet. A modulating valve is at the outlet so that process fluid can be selectively drawn from the dry indirect contact heat exchange section alone, from the second indirect contact heat exchange section in series with the dry indirect contact heat exchange section, or from both the dry and second indirect contact heat exchange sections and mixed. Separate air streams pass through the second indirect and direct contact heat exchange sections before entering the dry indirect contact heat exchange section. As a condenser, process fluid is directed to the dry indirect contact heat exchange section alone or to the dry and second indirect contact heat exchange sections in parallel by valves in the process fluid supply lines. In another embodiment, the process fluid flows in series from the dry to the second indirect contact heat exchange section. The system is operable in different modes to extract heat from the process fluid in the most efficient way with respect to annual water consumption. At low temperatures, the system operates dry with primary heat extraction performed by the dry indirect contact heat exchange section. At higher temperatures, the air streams may be adiabatically saturated with evaporative liquid to pre-cool them below the dry bulb temperature before entering the dry indirect contact heat exchange section. At still higher temperatures, the apparatus may be operated in a wet mode with the primary heat extraction performed by the second indirect contact heat exchange section. Heat is extracted from the process fluid while selectively distributing or not distributing the evaporative liquid over the second indirect contact heat exchange section.

SUMMARY OF THE INVENTION

The inventions disclosed herein are improvements to the inventions disclosed in U.S. Pat. No. 6,142,219 and corresponding European Patent No EP 1 035 396, the disclosures of which are both incorporated herein in their entirety.

This invention relates to a hybrid closed circuit cooler for extracting heat from a process fluid having a dry indirect heat exchange portion or "section" in fluid connection with an evaporative indirect heat exchange section, in which the evaporative indirect heat exchange portion or "section" is divided into a plurality of evaporative indirect heat exchange flow paths or "sub-sections." Each of the plurality of evaporative indirect heat exchange flow paths may be contained in a separate evaporative indirect heat exchange coil bundle. An evaporative fluid distribution system is located and configured to controllably and selectively distribute evaporative fluid over all, part, or none of the evaporative indirect heat exchange sub-sections. In addition, a process fluid flow path control system is configured to controllably and selectively direct the process fluid through one or more of the evaporative indirect heat exchange sub-sections. The process fluid flow path control system may send all of the process fluid through a single evaporative indirect heat exchange sub-sections, through two or more evaporative indirect heat exchange sub-sections in equal amounts, or through two or more evaporative indirect heat exchange sub-sections in different amounts. There is preferably a process fluid flow path that does not pass through at least one evaporative indirect heat exchange sub section. That is, there is preferably no evaporative heat exchange section bypass flow path.

The evaporative fluid distribution system and the process fluid flow path control system may be configured so that the evaporative indirect heat exchange sub-sections may collectively, or individually and separately, be run in evaporative mode and/or in dry mode. In particular, the system of the invention may be configured so that one or more subsections of the evaporative indirect heat exchange section are run in dry mode, and another one or more sub-sections of the evaporative indirect heat exchange section are run in evaporative mode. Additionally, one or more-subsections of the evaporative indirect heat exchange sections may be run in "adiabatic mode" according to which evaporative fluid is distributed over an evaporative indirect heat exchange sub-section, but no process fluid is passed through that sub-section, providing adiabatic cooling of the air flow passing through the evaporative indirect heat exchange section. Accordingly, the system may be configured so that one or more sub-sections of the evaporative indirect heat exchange section is running in dry mode (process fluid running, but no evaporative fluid running), one or more subsections are running in evaporative mode (process fluid running and evaporative fluid running), and/or one or more subsections are running in adiabatic mode (evaporative fluid running, but no process fluid running).

Air moving systems may be arranged according to methods known in the art to move air through the dry indirect heat exchange portion and the evaporative indirect heat exchange portion according to induced draft arrangement, forced draft arrangement, or some combination thereof (e.g., induced draft for one section and forced draft for another section)

Relative direction of air flow and process fluid flow for each of the heat exchange sections, collectively, or individually and separately, may be concurrent, countercurrent, or cross current.

The device according to the invention may optionally include a direct contact heat exchange section for cooling the evaporative fluid. The direct contact heat exchange section may optionally contain fill material. Air may be directed through the direct contact heat exchange section in cross-current, concurrent, or countercurrent arrangement.

According to one embodiment of the invention, there is provided a heat exchanger system for extracting heat from a process fluid including: a process fluid inlet; a process fluid outlet; a dry indirect contact heat exchange section receiving process fluid from the process fluid inlet and having an air inlet side, an air outlet side and a process fluid inlet and a process fluid outlet; a second evaporative indirect contact heat exchanger section that is split into at least two process fluid flow paths, a process fluid inlet and a process fluid outlet for each of the at least two process fluid flow paths, and an air inlet side and an air outlet side; a mechanism for moving air through the heat exchangers that can be induced draft, forced draft or other; a distribution system for selectively distributing an evaporative liquid to the second evaporative indirect contact heat exchanger section, or sub-section thereof; a process fluid connecting flow path from the dry indirect contact heat exchanger, which then divides and connects to both of the second evaporative indirect contact heat exchanger sections; a mechanism for directing the process fluid selectively to the process fluid inlets of the second evaporative indirect contact heat exchanger sections such that all of the process fluid may be split evenly between the two second sections, or may be split unevenly between sections, or may be entirely directed through only one of the sections; and a process fluid outlet flow path from the second indirect heat exchanger to the process fluid outlet. (FIGS. 1-4)

According to another embodiment, there may be included one or more mechanisms for moving air through the heat exchangers.

According to another embodiment, the mechanism for moving air through the heat exchanger is an induced draft system.

According to another embodiment, the mechanism for moving air through the heat exchanger is a forced draft system.

According to another embodiment, there is no process fluid flow path that does not travel through the evaporative indirect heat exchange section (i.e., no evaporative indirect heat exchange section by-pass).

According to another embodiment, the flow-divide in the evaporative heat exchange section can be equal or unequal.

According to another embodiment, the second evaporative heat exchanger can be two or more separate heat exchangers.

According to another embodiment, the second evaporative heat exchanger sections are connected in a series flow path for the process fluid. (FIG. 13a). According to yet another embodiment, the process fluid flow path may be controlled so that it only flows through fewer than all of the evaporative heat exchanger sections, bypassing others. (FIG. 13b).

According to another embodiment, the water distribution system may be two or more separate systems. The distribution system can be operated via separate flow means, such as pumps placed as separate systems, or it can be a single system separated with a valve or multiple valves in the main distribution pipe, or any other means to selectively shut of water flow to parts of the distribution system approximately corresponding to the internal flow divisions of the second evaporative heat exchanger section. (FIGS. 5-8). According to other embodiments, an evaporative fluid distribution system may be arranged to distribute evaporative fluid over fewer than all of the evaporative heat exchange sections. According to these embodiments, there may be one, two or more dry indirect sections, and two or more evaporative indirect sections, and the evaporative fluid distribution system is arranged over one or more evaporative indirect sections, and not present over one or more different evaporative indirect sections. (FIGS. 15a, 15b)

According to another embodiment, a partition separates the second heat exchanger section to further separate the flows from the water distribution system.

According to another embodiment, there are multiple dry heat exchangers with additional piping to connect to the flow distribution valve. The dry heat exchanger may have an additional flow control means to selectively distribute process fluid flow between the multiple dry heat exchangers creating unequal flows between the two or more dry heat exchanger sections or shutting off one or multiple of the dry heat exchangers. (FIGS. 9 and 10)

According to another embodiment, there is a mechanism for bypassing the process fluid around one or more of the dry heat exchanger sections. (FIG. 11)

According to another embodiment, the flow-divide in the dry heat exchange section can be equal or unequal and the dry heat exchanger can be two or more separate heat exchangers and the multiple dry heat exchangers may have a series process fluid flow path for the process fluid. (FIG. 12)

According to another embodiment, there is provided series process fluid flow path for either or both the multiple dry heat exchangers and the multiple evaporative heat exchangers. This can also be accomplished with single heat exchangers for either or both the dry and evaporative heat exchangers by using partitions within the heat exchanger headers. (FIGS. 12, 13a, and 14a). According to the series arranged evaporative sections, another embodiment permits the bypass of one or more evaporative sections, wherein the process fluid flow travels through fewer than all of the evaporative sections. (FIGS. 13b, and 14b).

Yet another embodiment includes modulating valves, or operational equivalent, to control flow to the various sections, where the modulating valve, or operational equivalent, can be operated either manually or automatically According to another embodiment, the amount of process fluid flow split between the two or more evaporative heat exchangers and the control of evaporative liquid flow over two or more evaporative heat exchangers depends upon the process fluid temperature. According to another embodiment, there is provided a mechanism for measuring the process fluid temperature and a means for controlling the modulating valve, or operational equivalent, and the distribution system flows (pumps) or valves.

According to another embodiment, a method is provided for extracting heat from a process fluid, the method including the steps of passing the process fluid through a dry indirect contact heat exchange section and selectively through one or more of a plurality of evaporative indirect heat exchange sections; selectively distributing or not distributing the evaporative liquid over one or more of the plurality of evaporative indirect heat exchange sections; controlling the flow of the process fluid to one or more of the plurality of evaporative indirect heat exchange sections, and controlling the evaporative fluid (e.g., water) flow to the section of the distribution system.

According to another embodiment, a method is provided for extracting heat from a process fluid including the steps of: providing a process fluid inlet and outlet; providing an evaporative liquid; providing a distribution system for the evaporative liquid, a dry heat exchange section, and a second divided indirect heat exchange section; passing the process fluid through the dry indirect contact heat exchange section and selectively through the flow paths of the second divided indirect heat exchange section; and selectively distributing or not distributing the evaporative liquid over the divisions of the second evaporative indirect heat exchange section, characterized by: providing a process fluid flow path from the dry indirect contact heat exchanger through one or more or all of the divisions of the evaporative heat exchanger section; providing a mechanism for controlling the process fluid flow to the divided flow paths of the evaporative heat exchange section, and providing a mechanism for controlling the evaporative fluid (e.g., water) flow to the section of the distribution system According to another embodiment, the method further includes the step of selectively moving process fluid flow through the second evaporative indirect heat exchanger sections as a function of the process fluid temperature.

According to another embodiment, the method includes turning on the evaporative distribution flow sections as a function of the process fluid temperature.

According to another embodiment, the method includes selectively moving process fluid flow through the dry heat exchanger sections as a function of the process fluid temperature.

DESCRIPTION OF THE DRAWINGS

The subsequent description of the preferred embodiments of the present invention refers to the attached drawings, wherein.

DETAILED DESCRIPTION OF THE INVENTION

Figure 1:
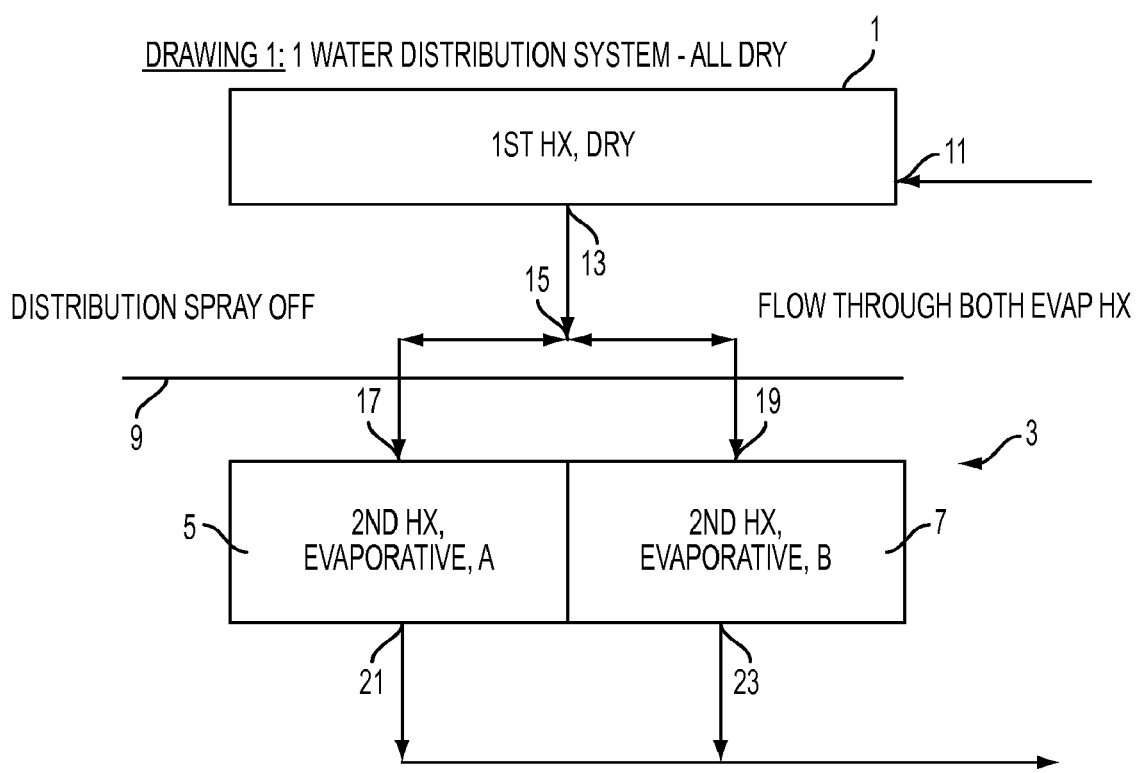
FIG. 1 is a representation of an embodiment according to the invention having a dry indirect heat exchange section and an evaporative heat exchange section having subsections A and B, in which the evaporative fluid flow is set to "off" and the process fluid is set to flow through both evaporative heat exchange subsections.
Figure 2:
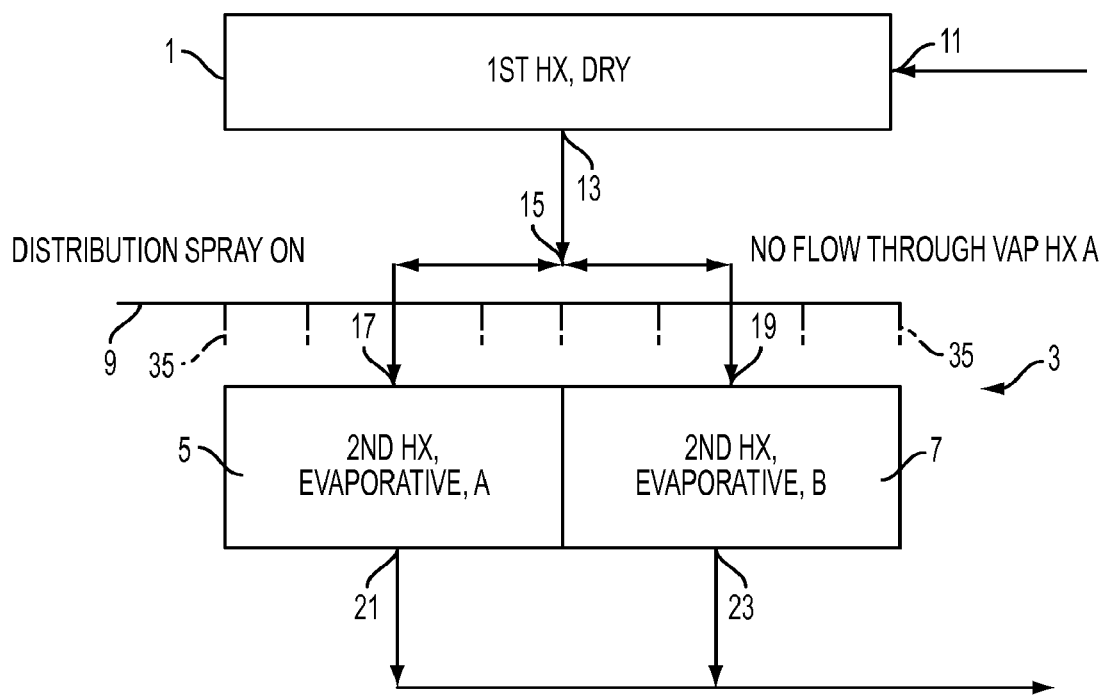
FIG. 2 is a representation of an embodiment according to the invention having a dry indirect heat exchange section and an evaporative heat exchange section having subsections A and B, in which the evaporative fluid flow is set to flow over both evaporative sub-sections, and in which the process fluid is set to flow only through one of the two evaporative subsections.
Figure 3:
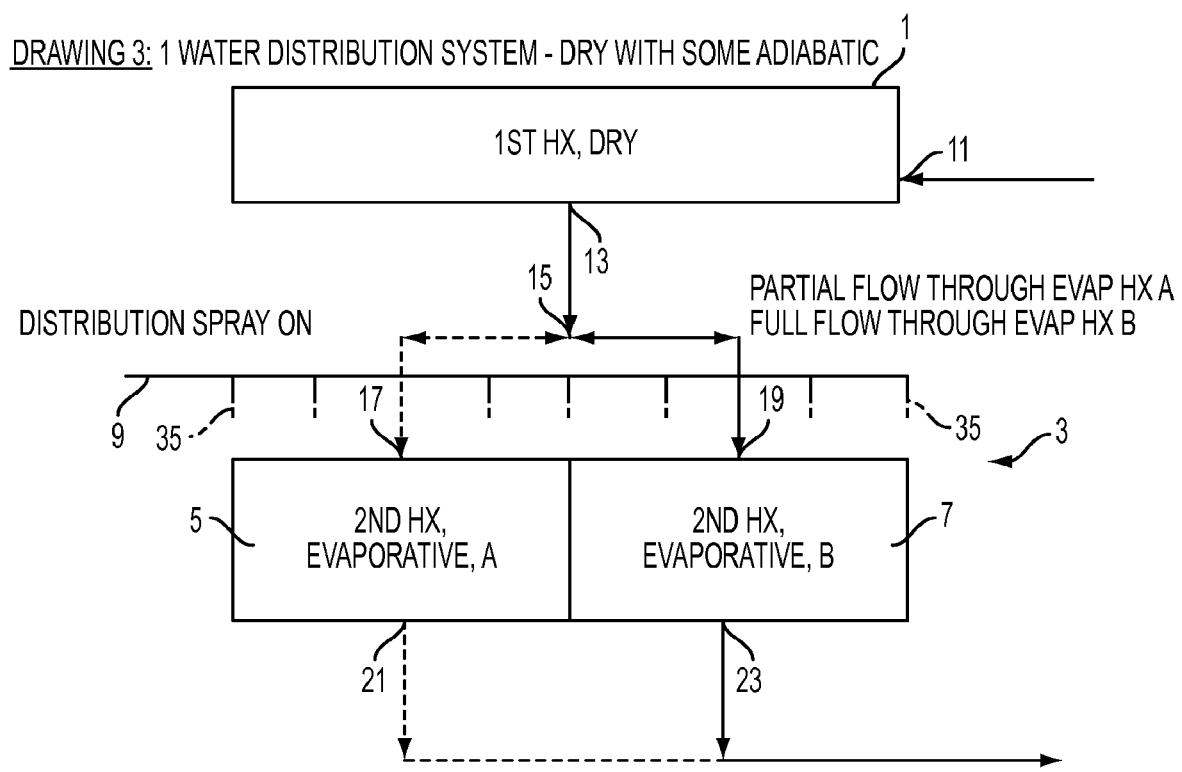
FIG. 3 is a representation of an embodiment according to the invention having a dry indirect heat exchange section and an evaporative heat exchange section having subsections A and B, in which the evaporative fluid flow is set to flow over both evaporative sub-sections, and in which the process fluid is set to a partial flow through one evaporative sub-section and to a full flow through a second evaporative sub-section.
Figure 4:
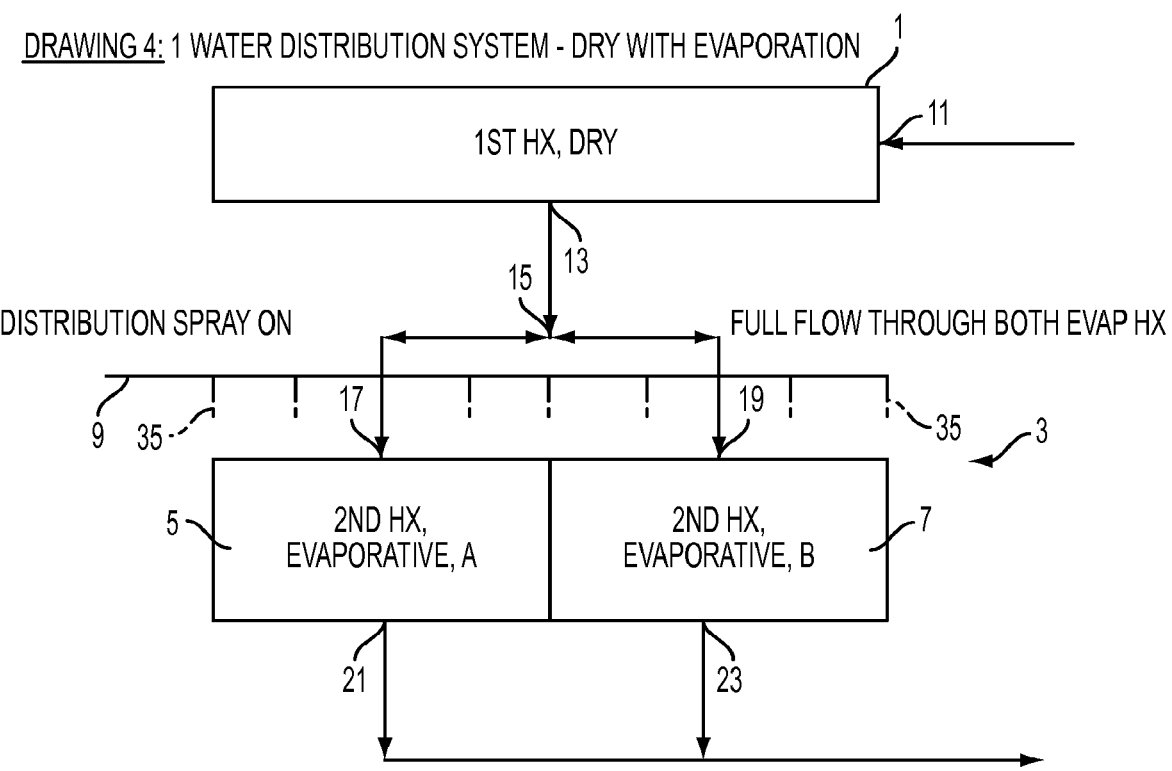
FIG. 4 is a representation of an embodiment according to the invention having a dry indirect heat exchange section and an evaporative heat exchange section having subsections A and B, in which the evaporative fluid flow is set to flow over both evaporative sub-sections and the process fluid is set to full flow through both evaporative heat exchange subsections.
Figure 5:
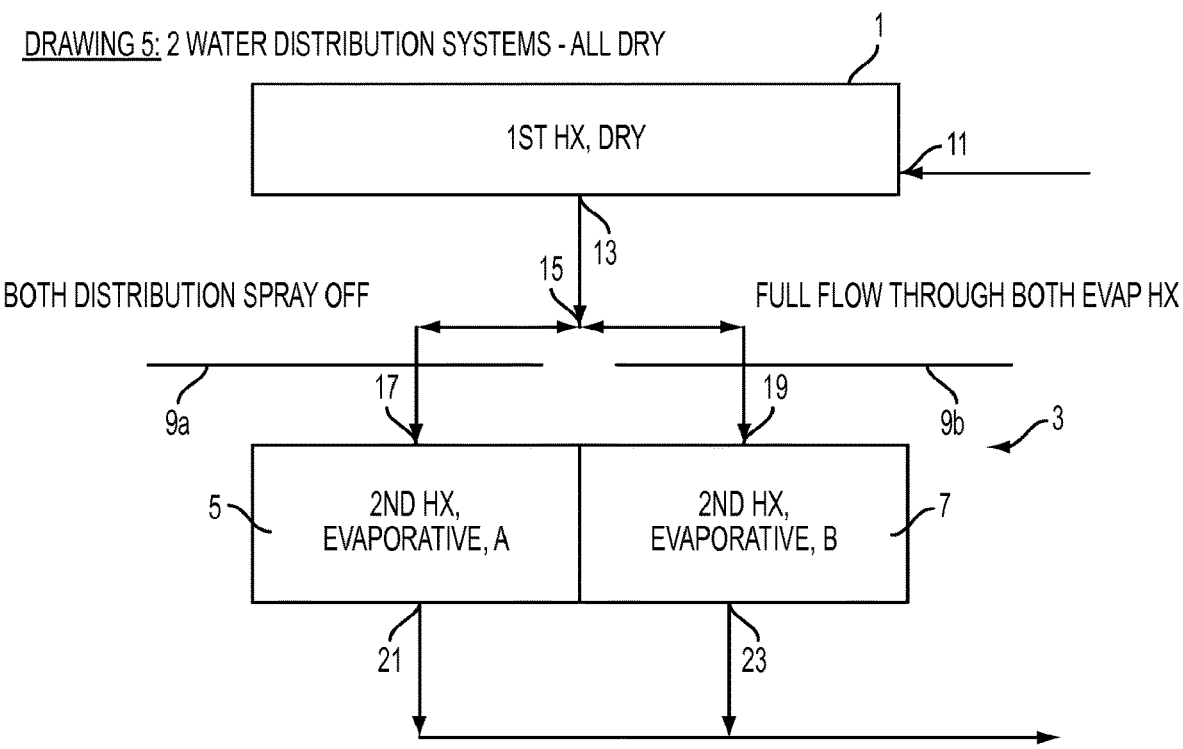
FIG. 5 is a representation of an embodiment according to the invention having a dry indirect heat exchange section, an evaporative heat exchange section having subsections A and B, and two evaporative fluid distribution systems, in which the evaporative fluid flow is set to "off" and the process fluid is set to flow through both evaporative heat exchange subsections.

A first structural embodiment of the heat exchange system of the invention is shown in FIGS. 1-4. The system of FIGS. 1-4 includes a dry indirect heat exchange section 1, an evaporative heat exchange section 3 having a plurality of subsections 5, 7, an evaporative fluid distribution system 9, a dry indirect section process fluid inlet 11, a dry indirect section process fluid outlet 13, a process fluid intermediate flow path valve 15 which can be used to direct the process fluid to one or more of the evaporative subsection inlets 17, 19, and evaporative subsection outlets 21, 23.

In the structural embodiment shown in FIGS. 1-4, the evaporative fluid distribution system 9 may be set to on (see evaporative fluid 35, FIG. 2-4) or off (FIG. 1). The process fluid intermediate flow path valve 15 may be set to allow the process fluid to flow in roughly equal amounts through evaporative subsections 5, 7 (FIGS. 1, 3), to flow only one evaporative subsections 17, 19 (FIG. 2), or to flow through one evaporative subsection (e.g., 7, FIG. 3) in substantially greater volumes than through another evaporative subsection (e.g., 5, FIG. 3).

A second structural embodiment of the heat exchange system of the invention is shown in FIGS. 5-8. This second embodiment is similar in structure to the structural embodiment shown in FIGS. 1-4, but has a plurality of evaporative fluid distribution systems 9a and 9b. Thus, the system of FIGS. 5-8 includes a dry indirect heat exchange section 1, an evaporative heat exchange section 3 having subsections 5, 7, evaporative fluid distribution systems 9a, 9b, a dry indirect section process fluid inlet 11, a dry indirect section process fluid outlet 13, a process fluid intermediate flow path valve 15 which can be used to direct the process fluid to one or more of the evaporative subsection inlets 17, 19, and evaporative subsection outlets 21, 23.

Figure 6:
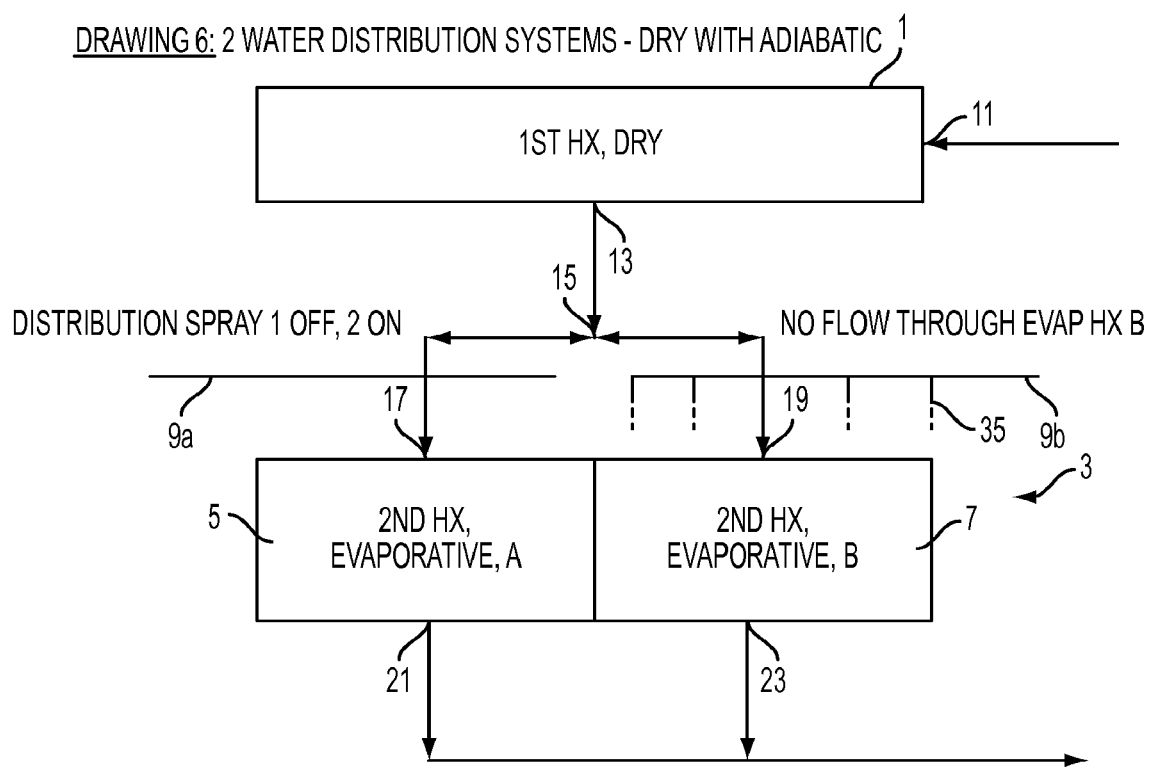
FIG. 6 is a representation of an embodiment according to the invention having a dry indirect heat exchange section, an evaporative heat exchange section having subsections A and B, and two evaporative fluid distribution systems, in which one evaporative fluid distribution system is set to "off" and a second evaporative fluid distribution system is set to distribute evaporative fluid over one subsection of the evaporative heat exchange section, and the process fluid is set to flow through the evaporative subsection which is not receiving evaporative fluid, and does not flow through the evaporative subsection over which evaporative fluid is distributed.
Figure 7:
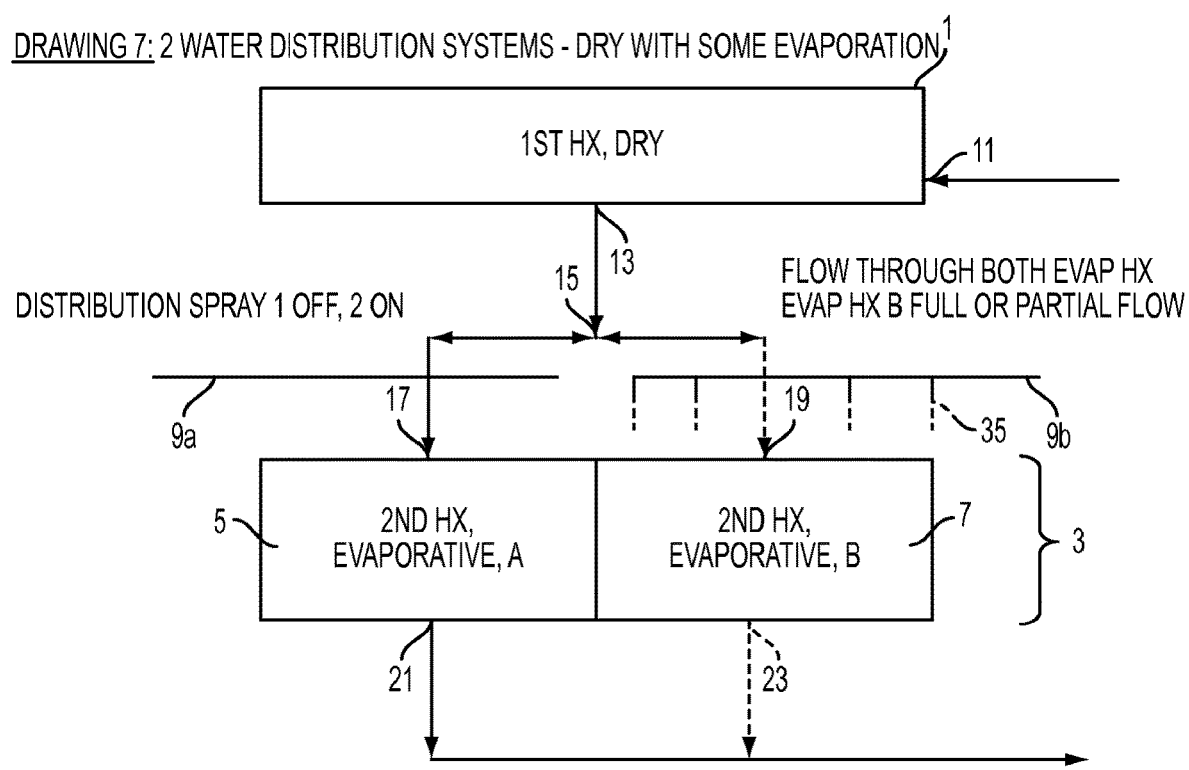
FIG. 7 is a representation of an embodiment according to the invention having a dry indirect heat exchange section, an evaporative heat exchange section having subsections A and B, and two evaporative fluid distribution systems, in which one evaporative distribution system is set to "off" and a second evaporative fluid distribution system is set to distribute evaporative fluid over one subsection of the evaporative heat exchange section, and the process fluid is set to fully flow through the evaporative subsection which is not receiving evaporative fluid, and is set to partially flow through the evaporative subsection over which evaporative fluid is distributed.
Figure 8:
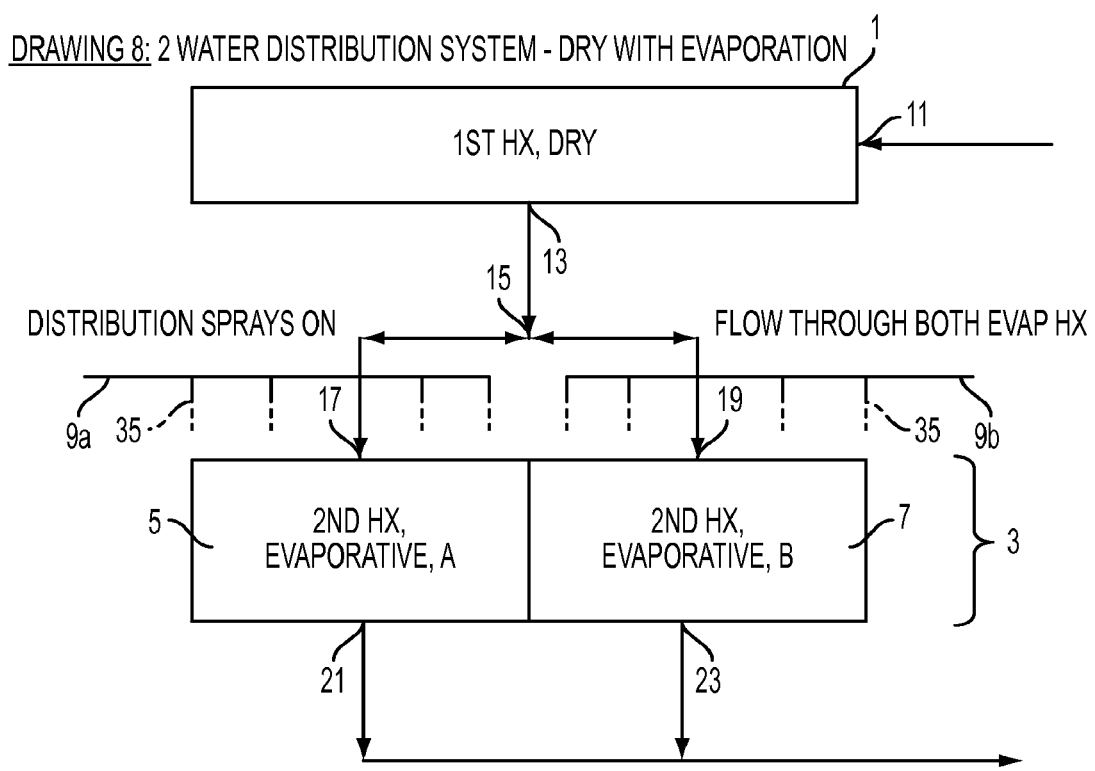
FIG. 8 is a representation of an embodiment according to the invention having a dry indirect heat exchange section, an evaporative heat exchange section having subsections A and B, and two evaporative fluid distribution systems, in which the evaporative fluid flow is set to flow over both evaporative subsections, and the process fluid is set to flow through both evaporative subsections.

In the structural embodiment of FIGS. 5-8, the evaporative fluid distribution systems 9a and 9b may both be turned off (FIG. 5), may both be turned on (FIG. 8), or one evaporative fluid distribution system 9a, 9b may be turned on and another turned off (FIGS. 6 and 7 show 9a turned off, and 9b turned on). Furthermore, the process fluid intermediate flow path valve 15 of the structural embodiment of FIGS. 5-8 may be set to allow the process fluid to flow in roughly equal amounts through multiple evaporative subsections 5, 7 (FIGS. 5, 8), to flow through only one evaporative subsections 17, 19 (FIG. 6), or to flow through one evaporative subsection (e.g., 7, FIG. 7) in substantially greater volumes than through another evaporative subsection (e.g., 5, FIG. 7).

Figure 9:
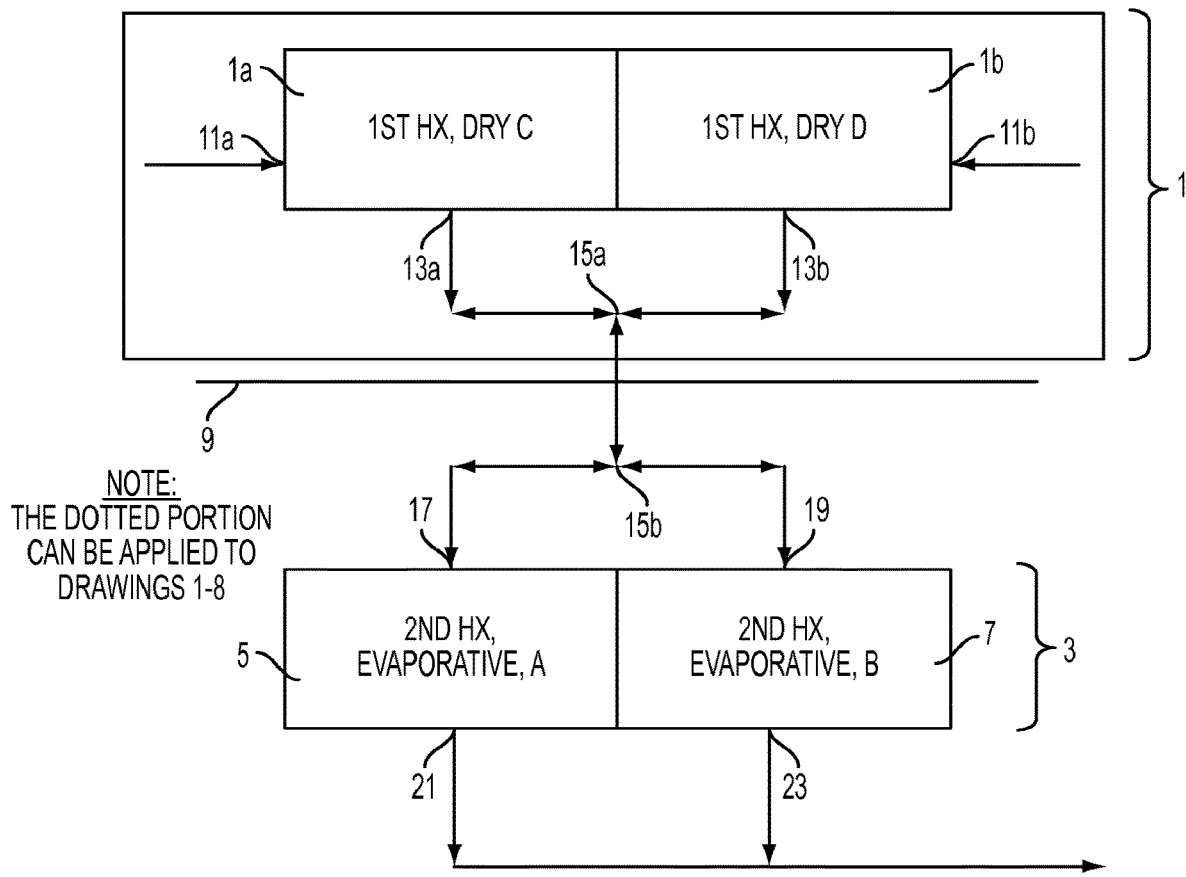
FIG. 9 is a representation of an embodiment according to the invention having a dry indirect heat exchange section having subsections C and D, an evaporative heat exchange section having subsections A and B, in which process fluid enters each dry indirect subsection in separate flow paths, in which, upon leaving the dry indirect subsections, the two process fluid paths are combined into a single process fluid flow path, which is then split into two process flow paths each of which flows through a different evaporative subsection. The embodiment of FIG. 9 has a single evaporative fluid distribution system, which is shown as turned off.

Yet another structural embodiment is shown in FIG. 9. The system of FIG. 9 includes a plurality of dry indirect heat exchange sections 1a, and 1b, an evaporative heat exchange section 3 having a plurality of subsections 5, 7, an evaporative fluid distribution system 9, dry indirect section process fluid inlets 11a, 11b, dry indirect section process fluid outlets 13a, 13b, a first and second process fluid intermediate flow path valves 15a, 15b, evaporative subsection inlets 17,19, and evaporative subsection outlets 21, 23.

In the structural embodiment of FIG. 9, process fluid may be directed to only one, to less than all, or to all of the plurality of dry indirect heat exchange sections 1a, and 1b. If process fluid is directed to only one of dry indirect heat exchange sections 1a, 1b, valve 15a may be used to prevent process fluid from flowing into another dry indirect heat exchange section. In the case the process fluid is directed to a plurality of dry indirect heat exchange sections 1a, 1b, valve 15a may be used to combine the process fluids exiting the dry indirect heat exchange sections. Valve 15b may be used to split the process fluid flow into equal or unequal parts and direct each part to a different of the plurality of evaporative sections 5, 7, or to direct the entire process fluid flow into only one of the plurality of evaporative sections 5, 7. FIG. 9 shows valve 15b sending equal parts of the process fluid flow into each of the plurality of evaporative sections 5, 7.

Figure 10:
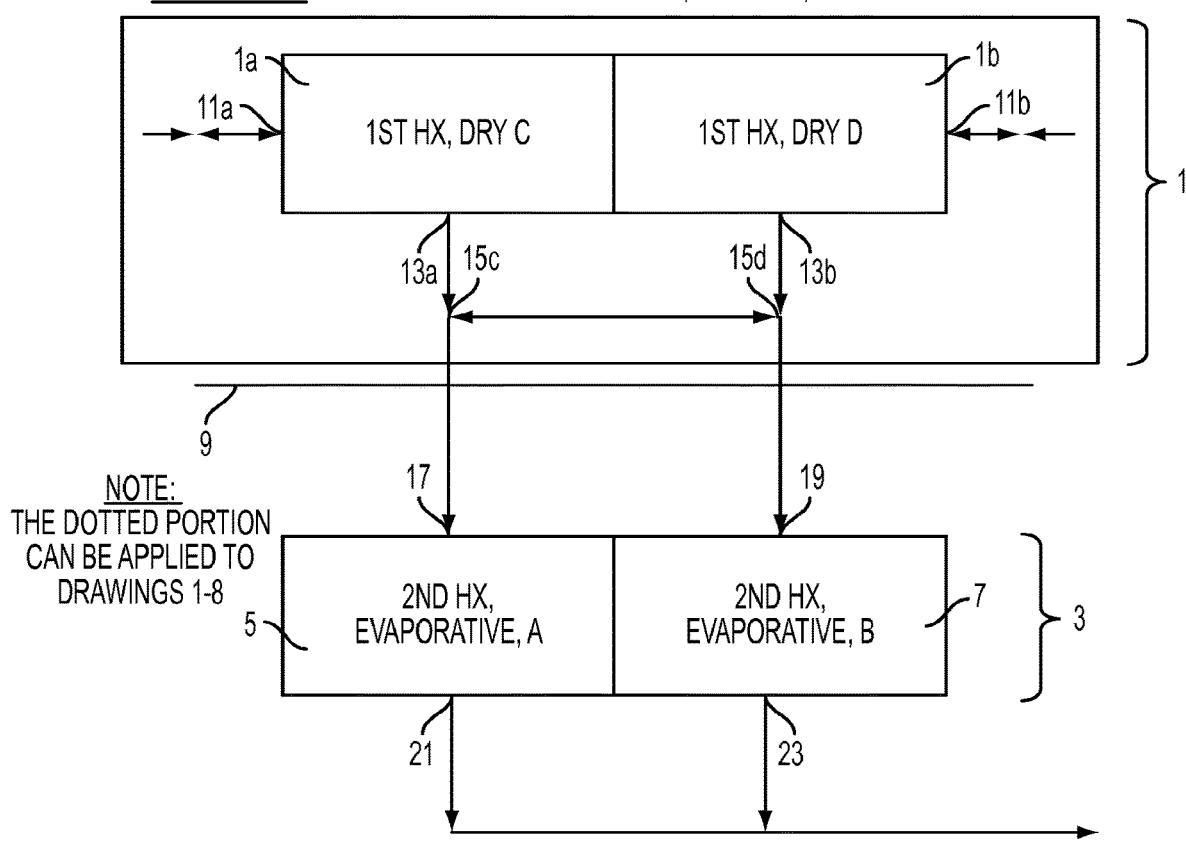
FIG. 10 is representation of an embodiment according to the invention having a dry indirect heat exchange section having subsections C and D, an evaporative heat exchange section having subsections A and B, in which process fluid enters each dry indirect subsection in separate flow paths, in which, upon leaving the dry indirect subsections, the two process fluid paths can be optionally and selectively mixed and or re-directed prior to entering the evaporative subsections. The embodiment of FIG. 10 has a single evaporative fluid distribution system, which is shown as turned off.

Another structural embodiment is shown in FIG. 10. The system of FIG. 10 includes a plurality of dry indirect heat exchange sections 1a, and 1b, an evaporative heat exchange section 3 having a plurality of subsections 5, 7, an evaporative fluid distribution system 9, dry indirect section process fluid inlets 11a, 11b, dry indirect section process fluid outlets 13a, 13b, a first and second process fluid intermediate flow path valves 15c, 15d, evaporative subsection inlets 17, 19, and evaporative subsection outlets 21, 23.

In the structural embodiment of FIG. 10, process fluid may be directed to only one, to less than all, or to all of the plurality of dry indirect heat exchange sections 1a, and 1b. If process fluid is directed to only one of dry indirect heat exchange sections 1a, 1b, valves 15c, 15d may be used to direct process fluid exiting a dry indirect heat exchange section to one or more of the plurality of heat exchange sections. In the case the process fluid is directed to a plurality of dry indirect heat exchange sections 1a, 1b, valves 15c, 15d may be used to direct the process fluid from each dry indirect section to a separate evaporative section, or to combine the process fluids from a plurality of dry indirect sections and direct the combined process fluid to a plurality of the evaporative sections. The valving shown in the drawings may be multiple valves to accomplish the flow paths or may be three way valves as deemed appropriate and useful.

Figure 11:
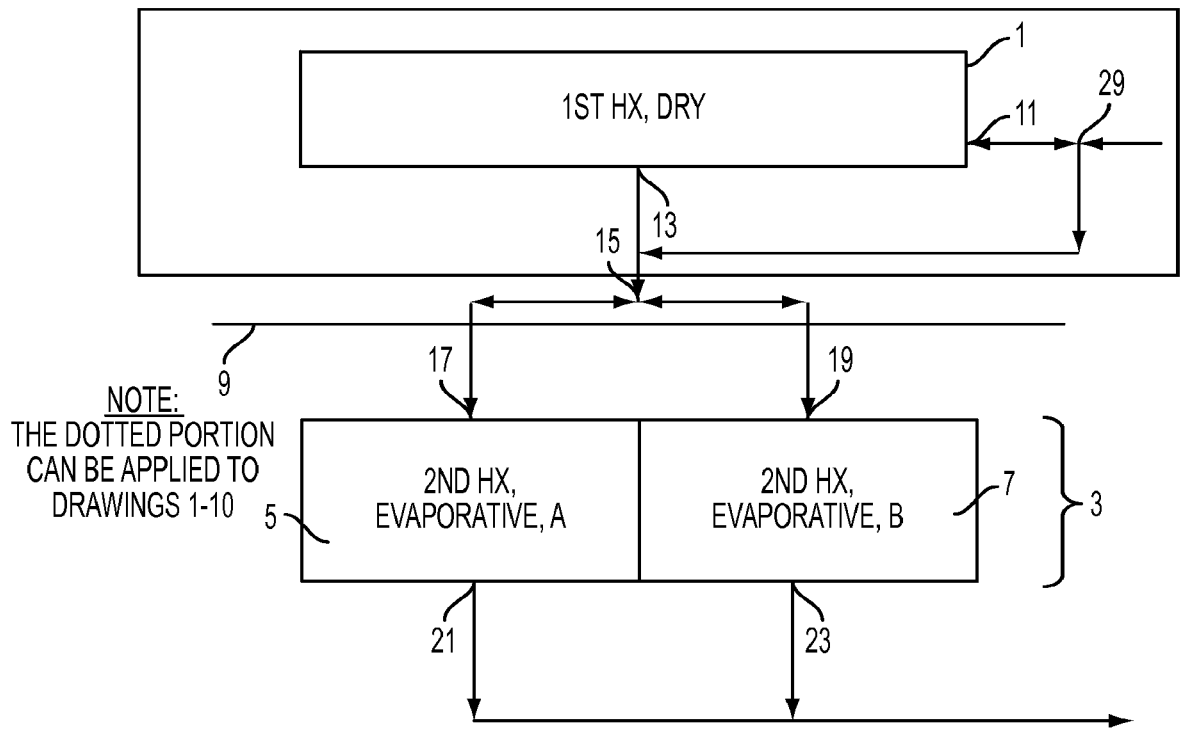
FIG. 11 is a representation of an embodiment according to the invention having a dry indirect heat exchange section, an evaporative heat exchange section having subsections A and B, in which process fluid can be optionally directed entirely or partially into the dry indirect section or optionally be directed to bypass the dry indirect section, and in which the process fluid flow may optionally be directed into one or both of the evaporative sub-sections. The embodiment of FIG. 11 has a single evaporative fluid distribution system, which is shown as turned off.

Yet another structural embodiment is shown in FIG. 11. The system of FIG. 11 includes a dry indirect heat exchange section 1, an evaporative heat exchange section 3 having a plurality of subsections 5, 7, an evaporative fluid distribution system 9, a dry indirect section process fluid inlet 11, dry indirect section process fluid outlet 13, a process fluid intermediate flow path valve 15, evaporative subsection inlets 17, 19, evaporative subsection outlets 21, 23, and a dry indirect section bypass valve 29.

The embodiment of FIG. 11 may be operated in all the same ways as the embodiments of FIGS. 1-4, with the additional ability of sending some or all of the process fluid directly to the evaporative section, bypassing the dry indirect section.

Figure 12:
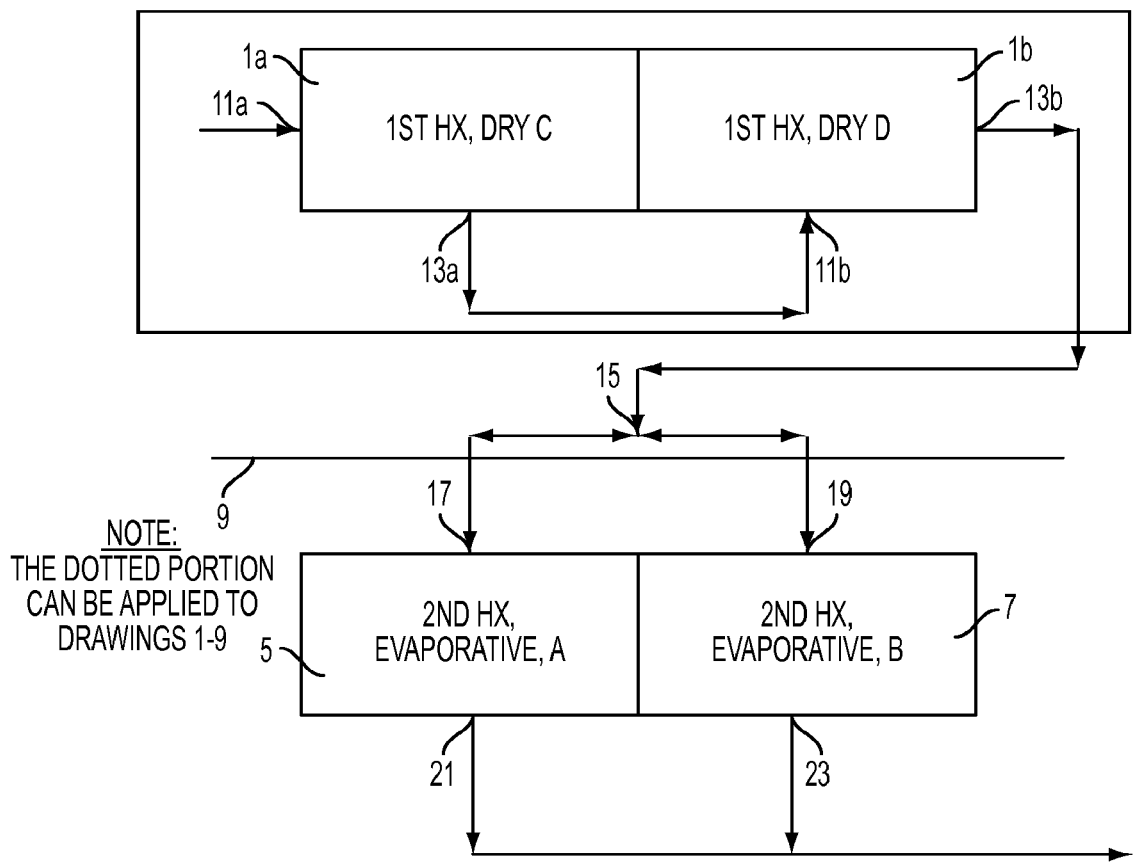
FIG. 12 is a representation of an embodiment according to the invention having a dry indirect heat exchange section having subsections C and D, an evaporative heat exchange section having subsections A and B, in which process fluid enters each dry indirect subsection one after the other, then proceeds to the evaporative section, and in which the process fluid flow path may be selectively directed to one or the other or to both evaporative subsections. The embodiment of FIG. 12 has a single evaporative fluid distribution system, which is shown as turned off.

Yet another structural embodiment is shown in FIG. 12. The system of FIG. 129 includes a plurality of dry indirect heat exchange sections 1a, and 1b, an evaporative heat exchange section 3 having a plurality of subsections 5, 7, an evaporative fluid distribution system 9, dry indirect section process fluid inlets 11a, 11b, dry indirect section process fluid outlets 13a, 13b, a process fluid intermediate flow path valve 15, evaporative subsection inlets 17, 19, and evaporative subsection outlets 21, 23.

In the structural embodiment of FIG. 12, process fluid is directed through dry indirect section process fluid inlet 11a to first dry indirect heat exchange section 1a, and then through dry indirect section process fluid outlet 13a and subsequently through dry indirect section process fluid inlet 11b to second dry indirect heat exchange section 1b. Process fluid then exits the second dry indirect section through dry indirect section outlet 13b. Valve 15a may be used to prevent process fluid from flowing into another dry indirect heat exchange section. In the case the process fluid is directed to a plurality of dry indirect heat exchange sections 1a, 1b. Valve 15 may be used to split the process fluid flow into equal or unequal parts and direct each part to a different of the plurality of evaporative sections 5, 7, or to direct the entire process fluid flow into only one of the plurality of evaporative sections 5, 7.

Figure 13A:
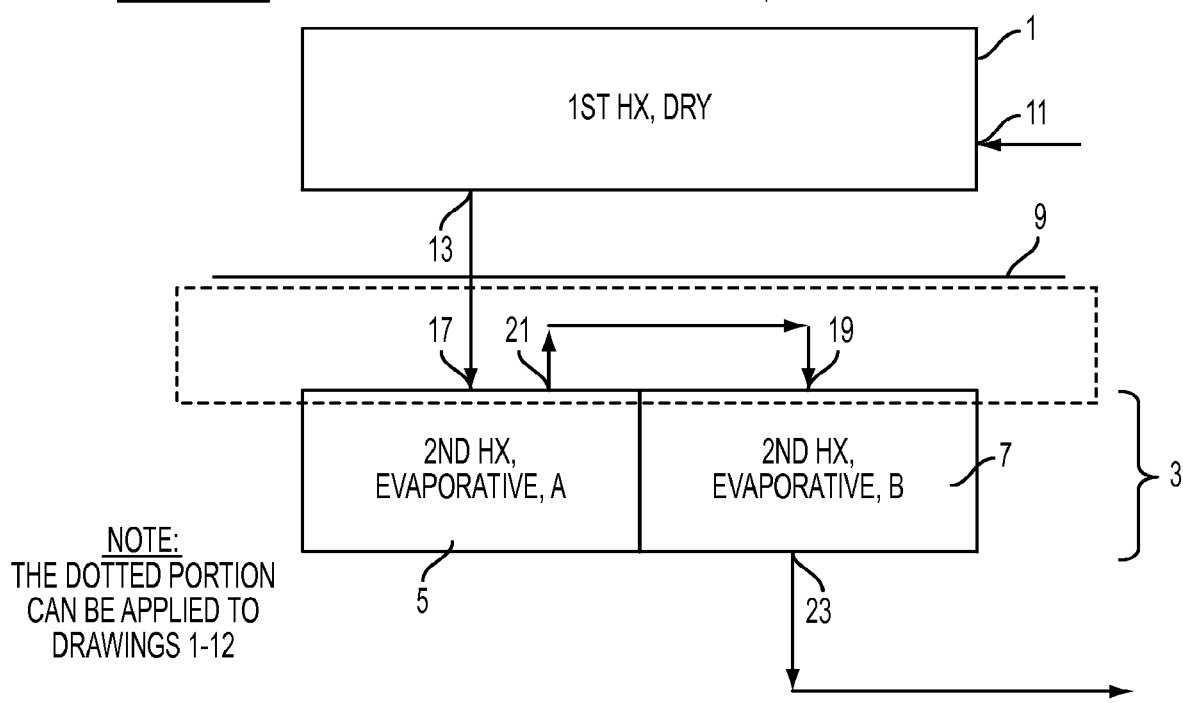
FIG. 13a is a representation of an embodiment according to the invention having a dry indirect heat exchange section, an evaporative heat exchange section having subsections A and B, in which process fluid enters each evaporative subsection one after the other. The embodiment of FIG. 13a has a single evaporative fluid distribution system, which is shown as turned off.
Figure 13B:
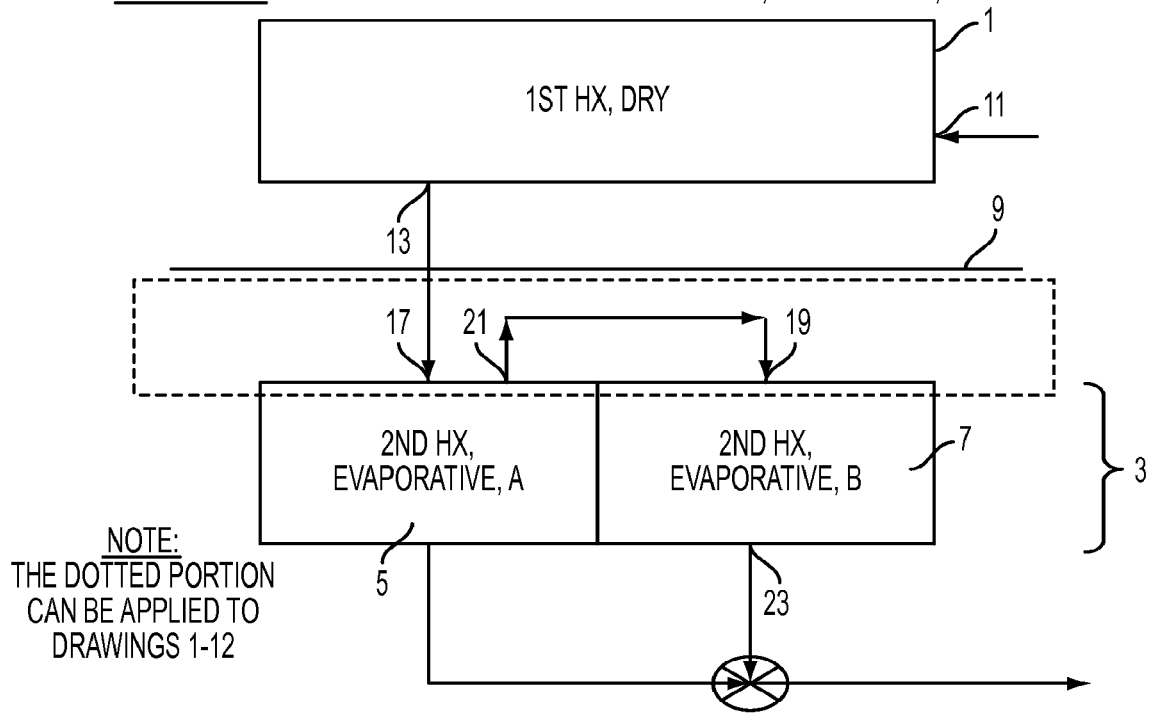
FIG. 13b is a representation of an embodiment according to the invention having a dry indirect heat exchange section, an evaporative heat exchange section having subsections A and B, in which process fluid enters each evaporative subsection one after the other, but in which the process fluid flow path may be controlled to bypass a second evaporative section and only flow through a first evaporative section. The embodiment of FIG. 13b has a single evaporative fluid distribution system, which is shown as turned off.

In yet another structural embodiment, shown in FIGS. 13a and 13b, the system includes dry indirect heat exchange section 1, an evaporative heat exchange section 3 having a plurality of subsections 5, 7, an evaporative fluid distribution system 9, dry indirect section process fluid inlet 11, dry indirect section process fluid outlet 13, evaporative subsection inlets 17, 19, and evaporative subsection outlets 21, 23.

In the structural embodiment of FIG. 13a, process fluid enters dry indirect section 1 through dry indirect heat exchange inlet 11, exits through dry indirect section outlet 13 and is directed to a first of said plurality of evaporative sections 5, 7 through evaporative section inlet 17. The process fluid then exits said first of said plurality of evaporative sections through evaporative section outlet 21, and enters a second of said plurality of evaporative sections through evaporative section inlet 19. The process fluid then exits the second evaporative section through evaporative section outlet 23.

In the structural embodiment of FIG. 13b, the process fluid can be optionally directed to bypass evaporative section B by operation of one or more valves 15.

Figure 14A:
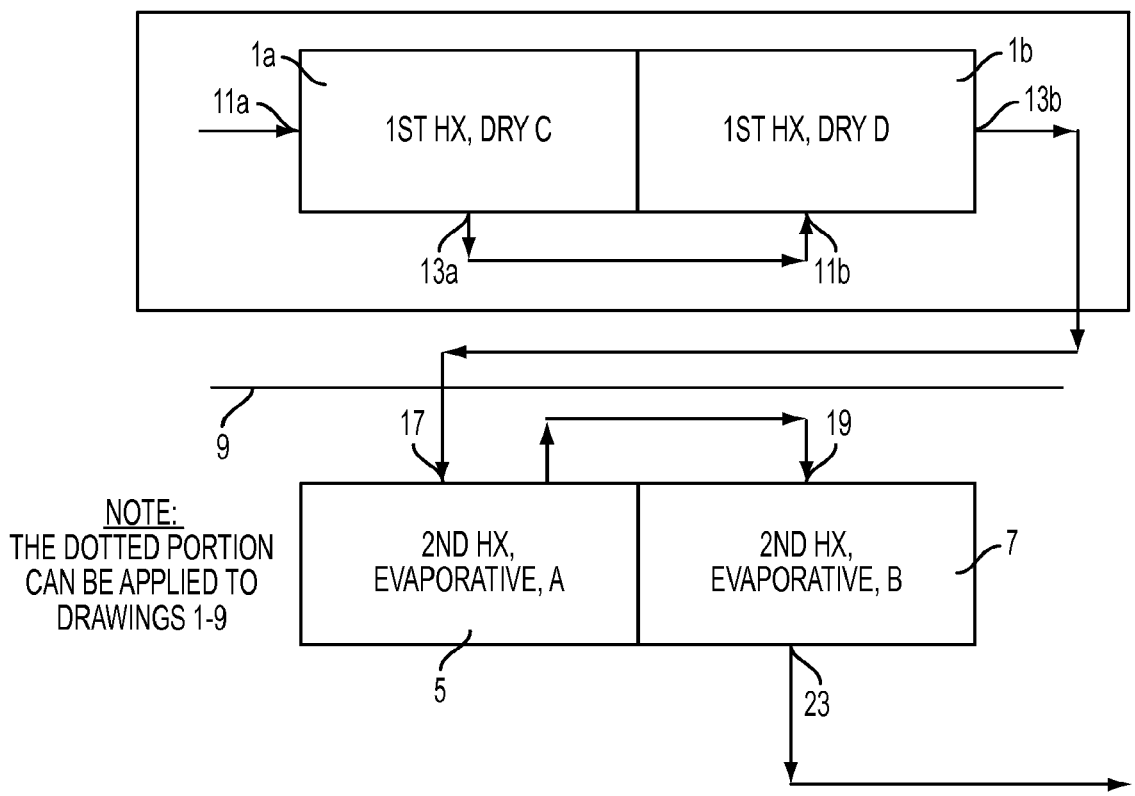
FIG. 14a is a representation of an embodiment according to the invention having a dry indirect heat exchange section having subsections C and D, an evaporative heat exchange section having subsections A and B, in which process fluid enters each evaporative subsection one after the other. The embodiment of FIG. 14a has a single evaporative fluid distribution system, which is shown as turned off.
Figure 14B:
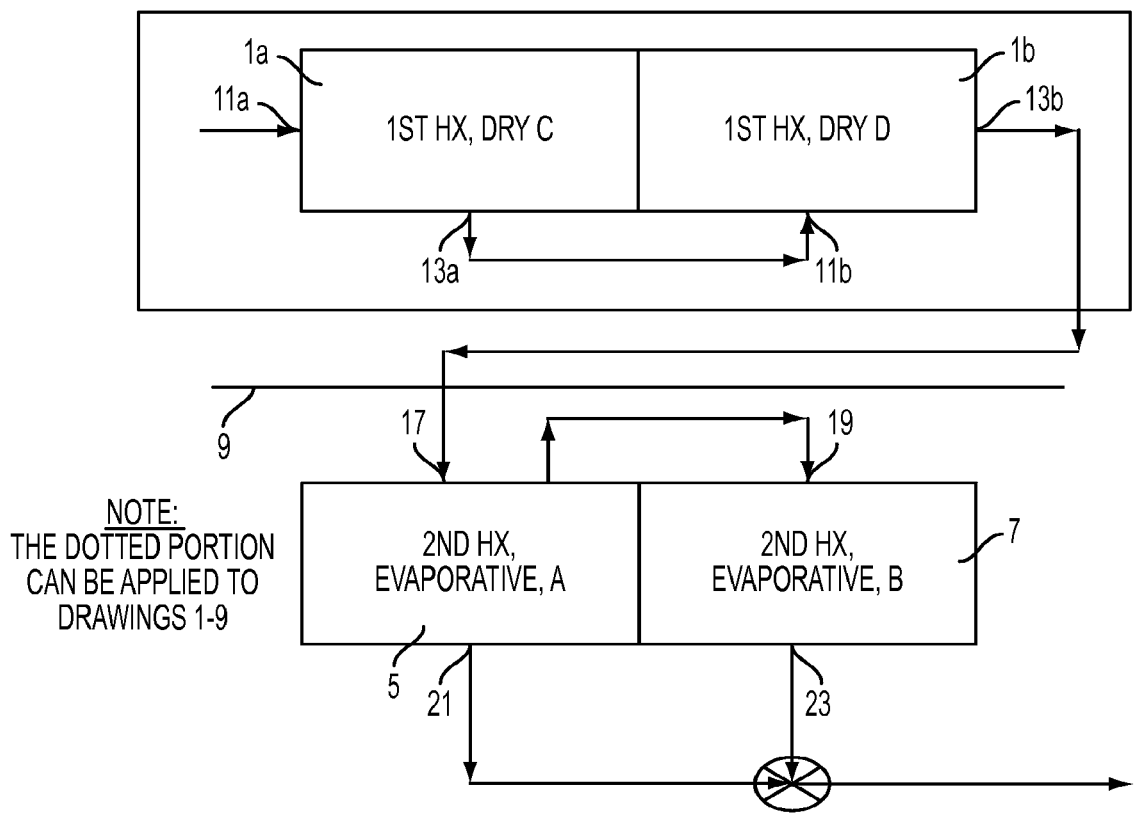
FIG. 14b is a representation of an embodiment according to the invention having a dry indirect heat exchange section having subsections C and D, an evaporative heat exchange section having subsections A and B, in which process fluid enters each evaporative subsection one after the other, but in which the process fluid flow path may be controlled to bypass a second evaporative section and only flow through a first evaporative section. The embodiment of FIG. 14b has a single evaporative fluid distribution system, which is shown as turned off.

The structural embodiments of FIGS. 14a and 14b represent a combination of multiple section dry heat exchange sections with a series process fluid flow path (for example, shown in FIG. 12), and multiple evaporative heat exchange sections with a series process fluid flow path (for example shown in FIGS. 13a and 13b).

Each of the embodiments shown in FIGS. 9-14 may have a plurality of evaporative fluid distribution systems, as shown in the embodiments of FIGS. 5-8.

Figure 15A:
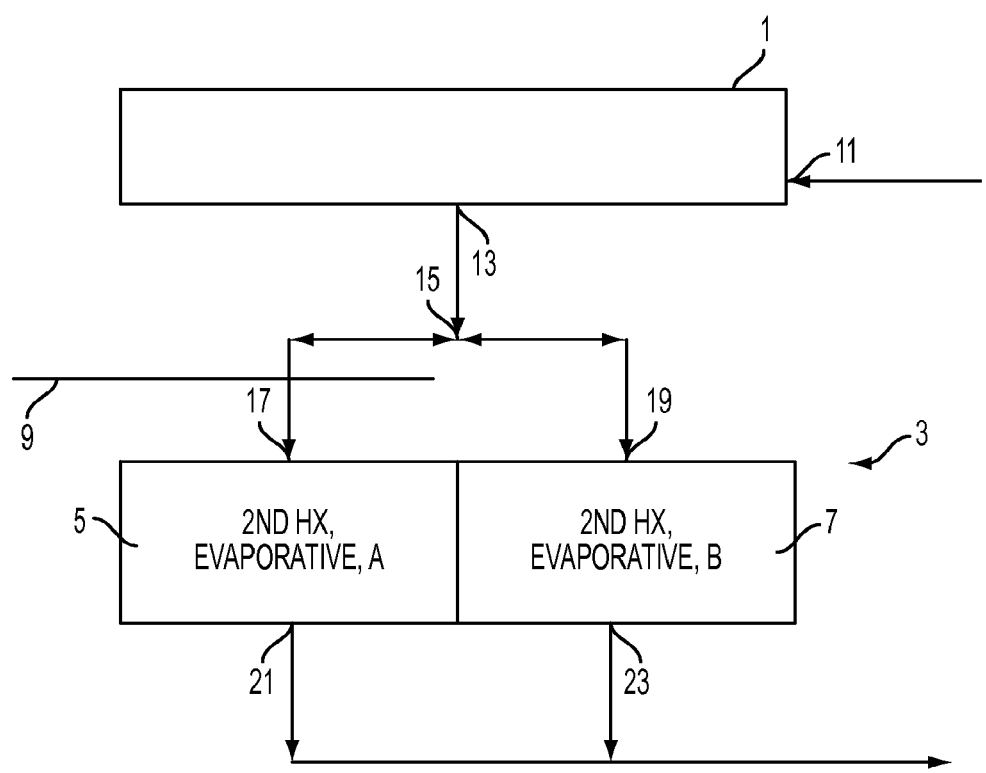
FIG. 15a is a representation of an embodiment according to the invention having a dry indirect heat exchange section (optionally having either a single section or a plurality of sections, arranged in either parallel or in series), an evaporative fluid distribution system, and an evaporative indirect heat exchange section having subsections A and B, with the process fluid flow path arranged to flow through the evaporative subsections in parallel. The evaporative fluid distribution system is located over fewer than all of the evaporative sections.
Figure 15B:
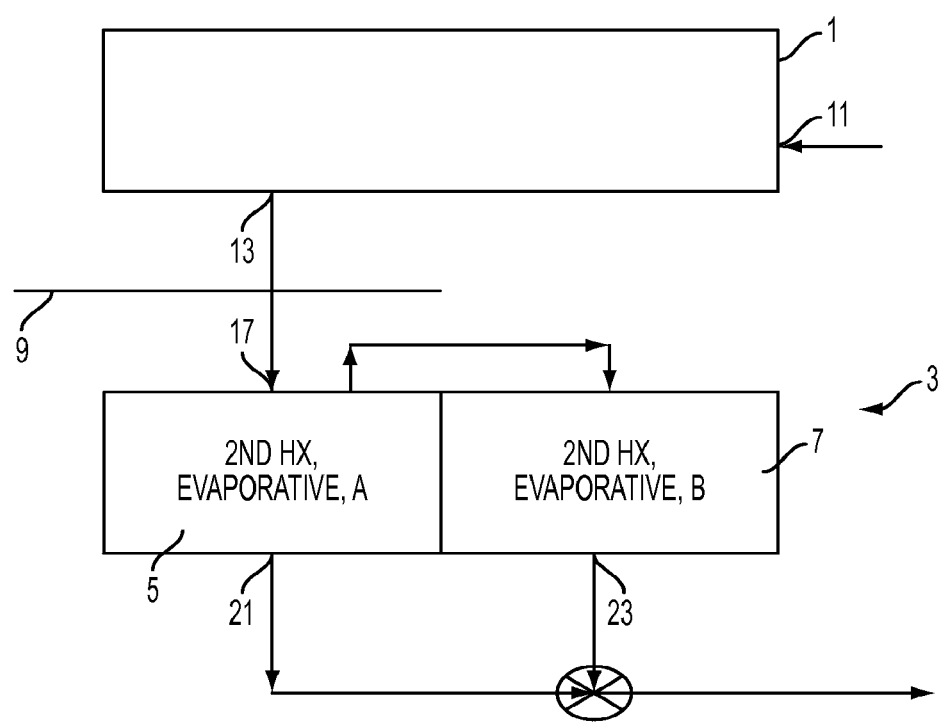
FIG. 15b is a representation of an embodiment according to the invention having a dry indirect heat exchange section (optionally having either a single section or a plurality of sections, arranged in either parallel or in series), an evaporative fluid distribution system, and an evaporative indirect heat exchange section having subsections A and B, with the process fluid flow path arranged to flow through the evaporative subsections in series. The evaporative fluid distribution system is located over fewer than all of the evaporative sections.
Figure 16:
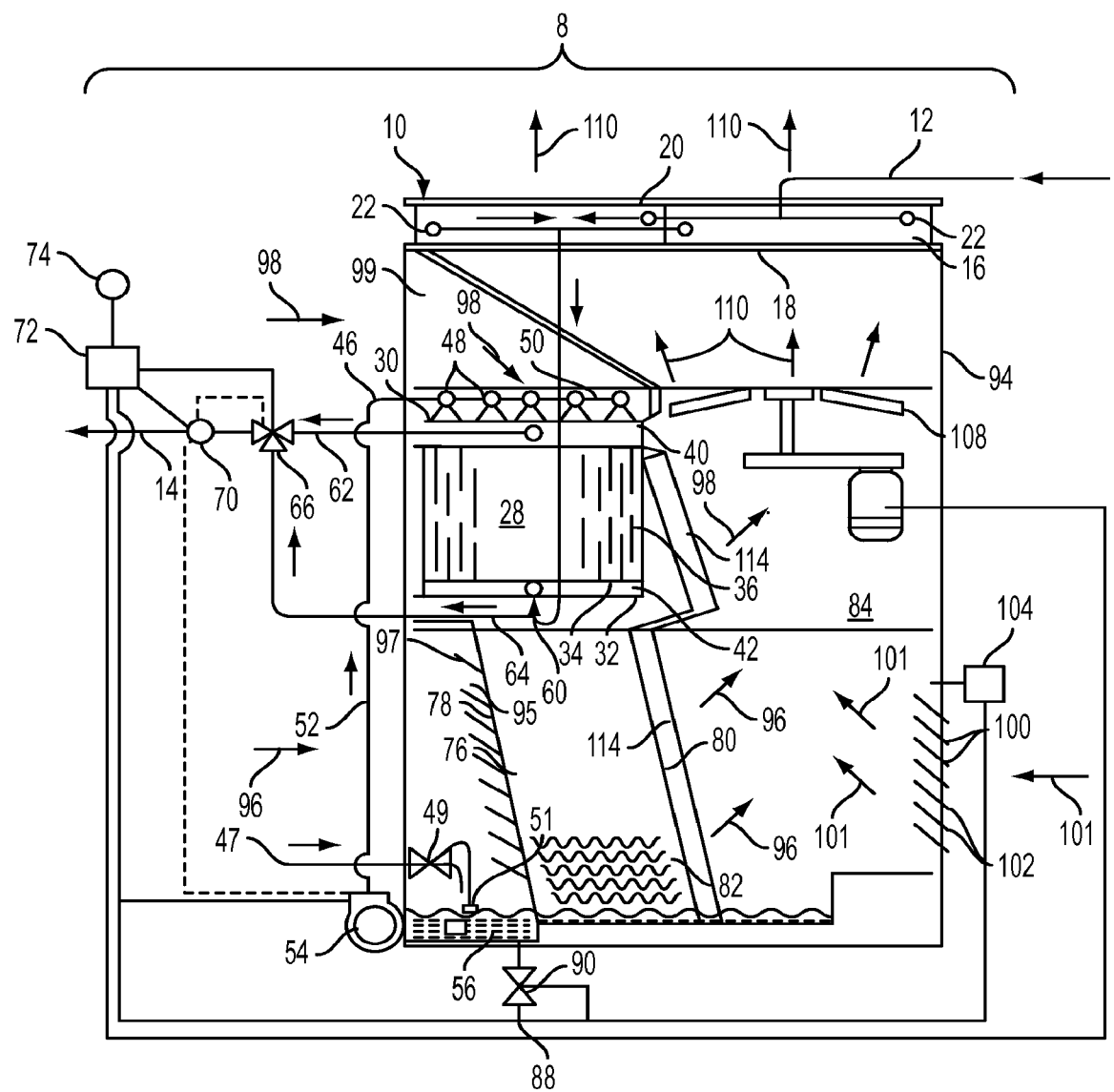
FIG. 16 is a side view schematic of a prior art (U.S. Pat. No. 6,142,219) closed circuit heat exchange system having a unitary dry indirect heat exchange section, a unitary evaporative indirect heat exchange section, a direct heat exchange system, a single evaporative fluid distribution system, a single process fluid flow path through said dry indirect section, a single process fluid flow path through said evaporative indirect section, and a process fluid path that bypasses said evaporative indirect section.

Additional structural embodiments are shown in FIGS. 15a and 15b. FIGS. 15a and 15b include a dry indirect heat exchange section 1, an evaporative heat exchange section 3 having a plurality of subsections 5, 7, an evaporative fluid distribution system 9, a dry indirect section process fluid inlet 11, dry indirect section process fluid outlet 13, a process fluid intermediate flow path valve 15, evaporative subsection inlets 17, 19, evaporative subsection outlets 21, 23, and a dry indirect section bypass valve 29. The dry indirect heat exchange section 1 may be a single unit, for example as shown in FIG. 11, or it may be a multiple section unit as shown, for example, in FIG. 12. In the embodiments of FIGS. 15a and 15b, the evaporative fluid distribution system is located over fewer than all of the evaporative indirect heat exchange systems.

FIG. 15a shows the process fluid flow path through the evaporative subsections as parallel flow, subject to the control of valve 15, which may be set to send all the flow through one or the other evaporative sections entirely, through one or more evaporative sections equally, or through multiple sections in different amounts.

FIG. 15b shows the process fluid flow path through the evaporative subsections as series flow, with the option to bypass an evaporative section by the action of the valve between outlet 21 and outlet 23.

According to a preferred aspect of each embodiment described herein, there is no process fluid bypass of the evaporative heat exchange system.

Each of the embodiments of FIGS. 1-15 may optionally be combined with a direct heat exchange section for cooling the evaporative fluid, in the case that one or more evaporative fluid distribution systems are operating. Such a direct heat exchange system may be located below the evaporative heat exchange section, or it may be located between the evaporative fluid distribution system nozzles and the evaporative heat exchange sections. A direct heat exchange system according to the invention may include fill, or it may not include fill.

Any combination of air flow direction, e.g., concurrent, countercurrent, cross-current, through each of the dry indirect section, the evaporative indirect section and the direct section is considered to fall within the scope of this invention. For example, the airflow through each of the sections may be concurrent; alternatively, the airflow through each of the sections may be countercurrent, or the airflow through each of the sections may be cross-current. The airflow may be concurrent through one section, two, or three sections. The airflow may be crosscurrent through one, two or three sections; and the airflow may be countercurrent through one, two or three sections. The airflow may be different in each section. Structures for creating and direction airflow through indirect and direct heat exchange sections are well known.

Independent of the direction of airflow for each section, each section may be part of the same airflow, or each section may have its own separate airflow, or each section may share a portion of the airflow from another section.

The embodiments of FIGS. 1-15 may be each used to modify and improve prior art heat exchange systems. An example of such a prior art system that may be improved with the features of the present invention is disclosed in U.S. Pat. No. 6,142,219 ("Korenic"), the entirety of which is incorporated herein by reference.

The invention claimed is:

1. A heat exchanger system for extracting heat from a process fluid comprising:
a system process fluid inlet;
a system process fluid outlet;
a dry indirect contact heat exchange section receiving process fluid from the system process fluid inlet and having a dry indirect contact heat exchange section air inlet side, a dry indirect contact heat exchange section air outlet side and a dry indirect contact heat exchange section process fluid inlet and a dry indirect contact heat exchange section process fluid outlet;
an evaporative indirect contact heat exchanger section comprising a plurality of separate evaporative heat exchange sub-sections connected in a series flow path for the process fluid, each separate evaporative heat exchange sub-sections having an evaporative heat exchange sub-section process fluid inlet and an evaporative heat exchange sub-section process fluid outlet, and an evaporative indirect contact heat exchanger section air inlet side and an evaporative indirect contact heat exchanger section air outlet side;
an air moving system for moving air through the heat exchanger system,
an evaporative liquid distribution system for selectively distributing an evaporative liquid to the only one of the plurality of separate evaporative heat exchange sub-sections, to less than all of the plurality of separate evaporative heat exchange sub-sections, and to all of the plurality of separate evaporative heat exchange sub-sections;
a process fluid connecting flow path from the dry indirect contact heat exchanger section process fluid outlet, which then divides and connects to each of the evaporative indirect contact heat exchanger sub-sections;
a mechanism for directing the process fluid from the dry indirect contact heat exchanger section process fluid outlet selectively to the evaporative indirect contact heat exchanger sub-section process fluid inlets such that according to a first selective setting all of the process fluid from the process fluid outlet of the dry indirect contact heat exchanger section is sequentially directed through two or more of the sub-sections, according to a second selective setting a portion of the process fluid from the process fluid outlet of the dry indirect contact heat exchanger section is directed only through a first of said sub-sections and a remaining portion of the process fluid from the process fluid outlet of the dry indirect contact heat exchanger section is directed into a second of said sub-sections, and according to a third selective setting all of the process fluid from the process fluid outlet of the dry indirect contact heat exchanger section is entirely directed through only one of the sub-sections; and a process fluid outlet flow path from the evaporative indirect contact heat exchanger section to the system process fluid outlet.

2. The heat exchanger system according to claim 1, comprising a plurality of evaporative fluid distribution systems, including a mechanism to selectively shut off water flow to parts of the evaporative fluid distribution system approximately corresponding to internal flow divisions of the evaporative indirect contact heat exchanger section.

3. The heat exchanger system according to claim 1, further comprising a partition separating portions of the evaporative indirect contact heat exchanger section to further separate the evaporative liquid falling from the evaporative liquid distribution system.

\* \* \* \* \*